(12) United States Patent
Schilder et al.

(10) Patent No.: US 12,736,116 B2
(45) Date of Patent: Sep. 15, 2026

(54) ELECTRIC DRIVE DEVICE FOR A MOTOR VEHICLE, IN PARTICULAR FOR A CAR, AND MOTOR VEHICLE

(71) Applicant: MERCEDES-BENZ GROUP AG, Stuttgart (DE)

(72) Inventors: Tobias Schilder, Ludwigsburg (DE); Juergen Schweitzer, Filderstadt (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 19/141,674

(22) PCT Filed: Nov. 17, 2023

(86) PCT No.: PCT/EP2023/082243
§ 371 (c)(1),
(2) Date: Jun. 20, 2025

(87) PCT Pub. No.: WO2024/132316
PCT Pub. Date: Jun. 27, 2024

(65) Prior Publication Data

US 2026/0218782 A1 Jul. 30, 2026

(30) Foreign Application Priority Data

Dec. 21, 2022 (DE) .................... 10 2022 004 848.5

(51) Int. Cl.

| | |
|---|---|
| ***F16H 37/08*** | (2006.01) |
| ***F16H 57/04*** | (2010.01) |
| ***H02K 7/00*** | (2006.01) |
| ***H02K 7/116*** | (2006.01) |
| *F16H 57/02* | (2012.01) |

(52) U.S. Cl.
CPC ....... *F16H 37/082* (2013.01); *F16H 57/0421* (2013.01); *F16H 57/0427* (2013.01);
(Continued)

(58) Field of Classification Search
CPC ............... F16H 37/082; F16H 57/0421; F16H 57/0427; F16H 57/0479; F16H 57/0483;
(Continued)

(56) References Cited

U.S. PATENT DOCUMENTS

| | | | | |
|---|---|---|---|---|
| 6,484,834 B2 * | 11/2002 | Bowen | .................... | B60L 50/16 903/910 |
| 7,762,366 B2 * | 7/2010 | Janson | .................. | B60K 6/365 475/5 |
| 2021/0070158 A1 | 3/2021 | Suyama et al. | | |

FOREIGN PATENT DOCUMENTS

| | | |
|---|---|---|
| DE | 102018008939 B3 | 12/2019 |
| DE | 102019207787 A1 | 12/2020 |

(Continued)

OTHER PUBLICATIONS

International Search Report and Written Opinion mailed Mar. 12, 2024 in related/corresponding International Application No. PCT/EP2023/082243.

(Continued)

*Primary Examiner* — Farhana Pervin
(74) *Attorney, Agent, or Firm* — PATENT PORTFOLIO BUILDERS PLLC

(57) ABSTRACT

An electric drive device for a motor vehicle includes a housing, a first planetary gear set arranged in the housing, which first planetary gear set has a first sun gear, a first planetary carrier, and a first ring gear as first elements. An electric engine has stator and a rotor and an input shaft that can be driven by the rotor is permanently connected to the first sun gear in a rotationally fixed manner. The first planetary gear set and the differential transmission are arranged coaxially to one another. A side shaft is arranged between the differential transmission and a vehicle wheel and passes through the rotor. The differential transmission has a bevel gear differential with an equalizing housing
(Continued)

Figure 1:
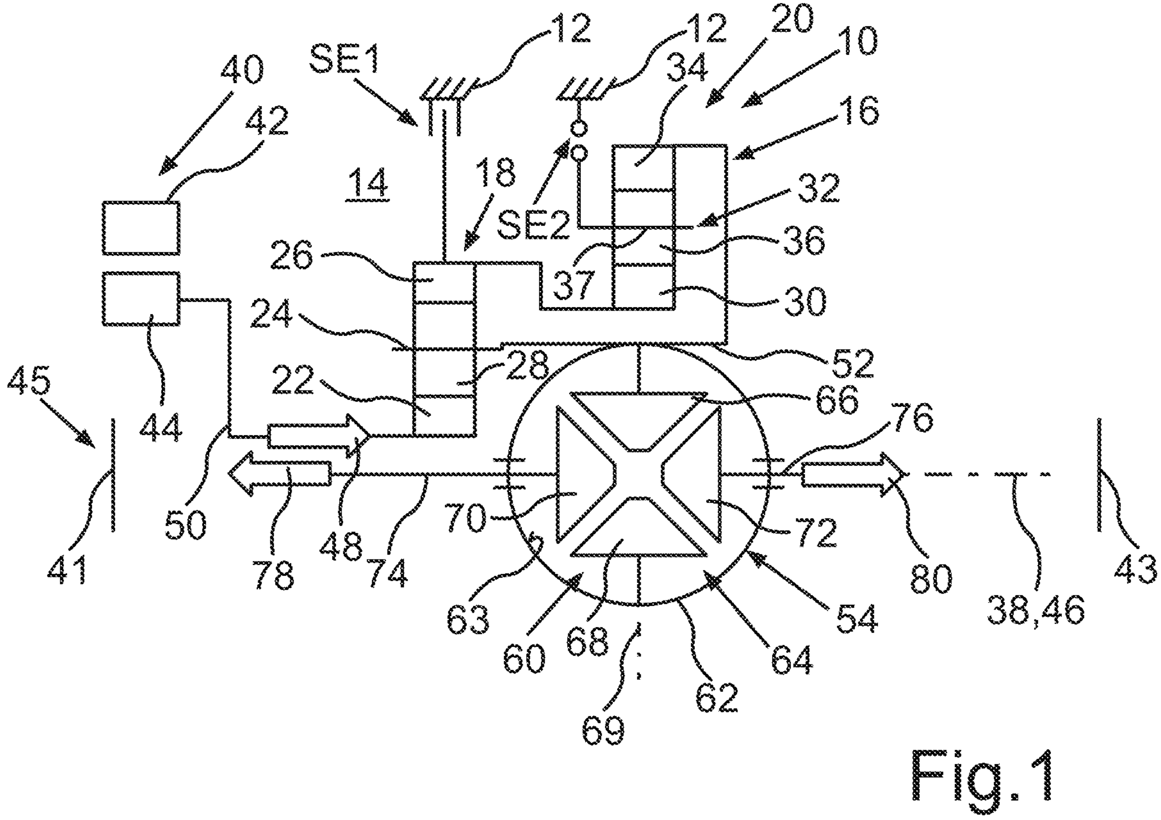

connected to the first planetary carrier in a rotationally fixed manner. The first sun gear is arranged axially adjacent to the equalizing housing.

10 Claims, 3 Drawing Sheets

(52) U.S. Cl.
CPC ..... *F16H 57/0479* (2013.01); *F16H 57/0483* (2013.01); *H02K 7/006* (2013.01); *H02K 7/116* (2013.01); *F16H 2057/02034* (2013.01)

(58) Field of Classification Search
CPC .......... F16H 2057/02034; H02K 7/006; H02K 7/116
See application file for complete search history.

(56) References Cited

FOREIGN PATENT DOCUMENTS

| | | | | |
|---|---|---|---|---|
| JP | H07301306 | A | 11/1995 | |
| JP | 2001132801 | A | 5/2001 | |
| JP | 2011174583 | A | 9/2011 | |
| JP | 2020128792 | A | 8/2020 | |
| WO | 2018207557 | A1 | 11/2018 | |
| WO | WO-2021151568 | A1 * | 8/2021 | ............... B60K 1/00 |

OTHER PUBLICATIONS

Office Action created Aug. 21, 2023 in related/corresponding DE Application No. 10 2022 004 848.5.

* cited by examiner

ELECTRIC DRIVE DEVICE FOR A MOTOR VEHICLE, IN PARTICULAR FOR A CAR, AND MOTOR VEHICLE

BACKGROUND AND SUMMARY OF THE INVENTION

Exemplary embodiments of the invention relate to an electric drive device for a motor vehicle, in particular for a car, as well as to a motor vehicle, in particular a car, having such an electric drive device.

An electric drive device for a motor vehicle is known from DE 10 2018 008 939 B3, having a housing and a first planetary gear set arranged in the housing, which has a first sun gear, a first planetary carrier and a first ring gear as first elements.

Moreover, JP 2011-174 583 A, US 2021/0 070 158 A1, JP H07-301 306 A, JP 2020 128 792 A, JP 2001-132 801 A and WO 2018/207 557 A1 show drive devices in which a planetary gear set is arranged immediately adjacent to an equalizing housing of a differential transmission, wherein an oil channel arranged inside the equalizing housing is immediately connected to a further oil channel arranged in a planetary carrier of the planetary gear set.

Exemplary embodiments of the present invention are directed to an electric drive device for a motor vehicle and a motor vehicle having such an electric drive device, such ha a particularly efficient operation can be realized.

A first aspect of the invention relates to an electric drive device for a motor vehicle, also referred to simply as a vehicle, which is preferably formed as a car, in particular as a passenger car. The electric drive device has a housing and a first planetary gear set, which is also referred to as a first planetary set or first planetary transmission. The first planetary gear set is arranged in the housing. The first planetary gear set has a first sun gear, a first planetary carrier, and a first ring gear. The first sun gear, the first planetary carrier, and the first ring gear are first elements of the first planetary gear set or are also referred to as first elements. In particular, when the respective first element is not connected to the housing in a rotationally fixed manner, the respective first element can be rotated around a first planetary gear set axis of rotation of the first planetary gear set in relation to the housing.

The electric drive device also has an electric engine, which has a stator and a rotor. The motor vehicle can be driven electrically, in particular exclusively so, by means of the electric engine. For this purpose, for example, the electric engine can provide drive torques via its rotor, by means of which the motor vehicle can be driven electrically, in particular exclusively so. In particular, the rotor can be driven by means of the stator and can thus be rotated around an engine axis of rotation in relation to the stator and in relation to the housing. It is preferably provided that the engine axis of rotation and the first planetary gear set axis of rotation coincide, such that the electric engine and the first planetary gear set are preferably arranged coaxially to each other. Furthermore, it is conceivable that the machine axis of rotation is spaced apart from the first planetary gear set axis of rotation and runs in parallel to the first planetary gear set axis of rotation.

The electric drive device also comprises an input shaft that can be driven by the rotor, in particular by the respective drive torque that can be provided by the electric engine via its rotor. The input shaft is permanently connected to the first sun gear in a rotationally fixed manner. Thus, the input shaft can be rotated relative to the housing around the first planetary gear set axis of rotation. In particular, it is conceivable that the input shaft is arranged coaxially to the rotor. The electric drive device moreover comprises an output shaft. The electric drive device moreover comprises a differential transmission, also known simply as a differential, which can be driven by the output shaft, for example. In particular, for example, the differential transmission can be driven via the output shaft by the first planetary gear set, wherein, for example, the first planetary gear set can be driven by the input shaft and via the input shaft by the electric engine, i.e., by the rotor. Thus, for example, the differential transmission can be driven by the electric engine, i.e., by the rotor, via the output shaft, the first planetary gear set and the input shaft. In other words, for example, the respective drive torque can be transmitted along a torque transmission path from the rotor and thus from the electric engine via the input shaft, the first planetary gear set, in particular the first sun gear, and the output shaft to the differential transmission, wherein, in relation to a flow direction in which the respective drive torque runs or flows along the torque transmission path and here from the rotor to the differential transmission, the rotor, the input shaft, the first planetary gear set, in particular the first sun gear, the output shaft, and the differential transmission are arranged in the torque transmission path in such a way that the input shaft is arranged downstream of the rotor and upstream of the first planetary gear set, in particular upstream of the first sun gear, the first planetary gear set, in particular the first sun gear, is arranged downstream of the input shaft and upstream of the output shaft, and the output shaft is arranged downstream of the first planetary gear set, in particular downstream of the first sun gear, and upstream of the differential transmission. The drive device moreover comprises at least one side shaft, which can, for example, be formed as a cardan shaft. For example, a vehicle wheel of the motor vehicle, also simply referred to as a wheel, can be driven by the side shaft, wherein the wheel or the vehicle wheel is also referred to as the first wheel or first vehicle wheel. The side shaft is also referred to as the first side shaft. When the wheel or the vehicle wheel is referred to below, this is understood to mean the first wheel or the first vehicle wheel, unless otherwise specified. In particular, the vehicle wheel can be driven by the respective drive torque. The torque transmission path thus also runs, for example, from the differential transmission via the side shafts, in particular to the vehicle wheel, such that, for example, the side shaft and, for example, also the vehicle wheel are arranged in the torque transmission path in such a way that the side shaft is arranged downstream of the differential transmission and upstream of the vehicle wheel with respect to the aforementioned flow direction and the vehicle wheel is arranged downstream of the side shaft. Thus, for example, the side shaft can be driven by the differential transmission, and the vehicle wheel can be driven by the side shaft. The side shaft is thus arranged, in particular in the torque transmission path, between the differential transmission and the vehicle wheel, i.e., downstream of the differential transmission and upstream of the vehicle wheel (wheel) of the motor vehicle. It is conceivable that the drive device has a second side shaft, which is formed as a cardan shaft, for example. Here, it is conceivable that a second vehicle wheel of the motor vehicle can be driven by the second side shaft, wherein the second vehicle wheel is also referred to as the second wheel. The torque transmission path thus also extends, for example, from the differential transmission via the second side shafts and in particular to the second vehicle wheel, such that, for example, the second side shaft and in particular, for example, the second vehicle wheel are also arranged in the torque transmission path, in particular in such a way that, in particular with respect to the aforementioned flow direction, the second side shaft is arranged downstream of the differential transmission and upstream of the second vehicle wheel and the second vehicle wheel is arranged downstream of the second side shaft. For example, the second side shaft can here be driven by the differential transmission, and the second vehicle wheel can be driven by the second side shaft. This can be carried out, for example, in such a way that the torque transmission path branches off, in particular at the differential transmission, or is branched off, for example, in particular by the differential transmission, in such a way that, starting from the differential transmission, a first branch of the torque transmission path runs via the first side shaft and, in particular, towards the first vehicle wheel, and a second branch of the torque transmission path runs via the second side shaft and, in particular, towards the second vehicle wheel. In particular, it is conceivable that the first vehicle wheel and the second vehicle wheel are vehicle wheels of a vehicle axle of the motor vehicle, which is also simply referred to as an axle, wherein preferably the vehicle wheels of the vehicle axle are arranged on opposite sides of the motor vehicle in the transverse direction of the motor vehicle. In particular, the respective side shaft can be driven by the differential transmission and, for example, by the output shaft via the differential transmission, such that the side shafts can be driven by the electric engine, in particular by the rotor, for example via the differential transmission, the output shaft, the first planetary gear set, in particular the first sun gear, and the input shaft. As a result, the vehicle wheels and thus the motor vehicle as a whole can be driven electrically, in particular exclusively so.

It is conceivable that the motor vehicle in its completely manufactured state has at least or exactly one vehicle axle, also referred to as axles, namely the aforementioned vehicle axle, also referred to as the first vehicle axle, and a second vehicle axle, which can have, for example, at least or exactly two further vehicle wheels, which can be arranged, for example, on the sides of the motor vehicle opposite one another in the transverse direction of the motor vehicle. Here, the vehicle axles are arranged one after the other and thus one behind the other, for example in the longitudinal direction of the motor vehicle. The vehicle wheels are ground contact elements via which the motor vehicle can be supported or is supported downwardly on the ground in the vertical direction of the motor vehicle. If the motor vehicle is driven along the ground while the motor vehicle is supported downwards on the ground via the ground contact elements in the vertical direction of the vehicle, then the ground contact elements roll, in particular directly, on the ground. When the vehicle wheels are referred to in the following, this is to be understood to mean, unless otherwise stated, the first vehicle wheel and the second vehicle wheel, wherein in particular the first vehicle wheel and the second vehicle wheel can be driven by the differential gear and, via the differential transmission, by the rotor, i.e., by the electric engine. Here, the differential transmission has, for example, the function already sufficiently known from the general prior art that the differential transmission permits a rotational speed equalization between the vehicle wheels, such that the vehicle wheels can rotate at different rotational speeds, for example when the motor vehicle is cornering, in particular while the vehicle wheels can be driven or are driven by the rotor, i.e., by the electric engine. In other words, the vehicle wheels can be driven electrically by the rotor and thus by the electric engine via the differential transmission. If, for example, the vehicle wheels are driven electrically by the electric engine, i.e., by the rotor, when the motor vehicle is cornering, in particular via the side shafts, also known as output shafts, then the differential transmission allows such a rotational speed equalizing between the vehicle wheels that, when cornering, the vehicle wheel on the outside of the bend rotates or can rotate at a higher rotational speed than the vehicle wheel on the inside of the bend, in particular without resulting in excessive tensioning of the electric drive device. The function of the differential transmission preferably also comprises that the respective drive torque for electrically driving the vehicle wheels, which is provided or can be provided by the electric engine via the rotor, is transmitted via the differential transmission to the vehicle wheels, in particular to the side shafts and thus to the vehicle wheels, and in particular is split, in particular by branching the torque transmission path.

The differential transmission is or comprises a bevel gear differential with an equalizing housing permanently connected to the first planetary carrier in a rotationally fixed manner. The equalizing housing can thus be rotated around the first planetary gear set axis of rotation relative to the housing. The first planetary gear set and the differential transmission are thus arranged coaxially to each other. The first side shaft arranged between the differential transmission, in particular the equalizing housing, and the first vehicle wheel of the motor vehicle passes through the rotor. This means that the first side shaft penetrates the rotor of the electric engine, in particular completely, in particular in the axial direction of the electric engine and thus viewed along the axis of rotation of the engine. Furthermore, it is provided that the first sun gear is arranged axially, i.e., in the axial direction of the planetary gear set and thus of the electric drive device as a whole, adjacent to the equalizing housing. This means that the term "axial" is to be understood as the axial direction of the electric drive device, which corresponds to the axial direction of the first planetary gear set and thus to the first planetary gear set axis of rotation or coincides with the first planetary gear set axis of rotation.

The differential transmission has, for example, equalizing gears that are rotatably mounted on the equalizing housing and, in particular, arranged in the equalizing housing, which can be first gear wheels, in particular first bevel gears. Moreover, the differential transmission has, for example, output gears, which can be second gear wheels, in particular second bevel gears. The output gears mesh, in particular simultaneously, with the equalizing gears. The equalizing gears and the output gears are gear wheels of the differential transmission, wherein the gear wheels are preferably formed as bevel gears. In particular, the equalizing gears can be rotated around a common equalizing gear axis of rotation relative to one another and relative to the equalizing housing, wherein the equalizing gear axis of rotation runs perpendicularly to the first planetary gear set axis of rotation. The output gears can be rotated around a common output gear axis of rotation relative to one another and relative to the equalizing housing, wherein the equalizing gear axis of rotation coincides with the first planetary gear set axis of rotation. In particular, the output gears are arranged in the equalizing housing. For example, the first side shaft can be driven by a first of the output gears, in particular in such a way that the first side shaft is connected to the first output gear in a rotationally fixed, in particular permanently rotationally fixed, manner. For example, the second side shaft can be driven by the second output gear, in particular in such a way that the second side shaft is connected to the second output gear in a rotationally fixed, in particular permanently rotationally fixed, manner. For example, a receiving chamber is delimited, in particular directly, by the equalizing housing, in particular by an inner circumferential surface of the equalizing housing, wherein preferably the equalizing gears and/or the output gears are each arranged at least partially, in particular respectively at least predominantly and thus at least more than half or even completely, in the receiving chamber.

In order to keep losses particularly low and thus to be able to realize a particularly low-loss and thus particularly efficient operation of the electric drive device and thus of the motor vehicle as a whole, it is provided in an inherently known manner that the largest outer radius of the equalizing housing is arranged radially, i.e., viewed in the radial direction of the drive device and thus of the first planetary gear set, outside the first planetary gear bolts of the first planetary carrier. The radial direction of the drive device and thus of the first planetary gear set runs perpendicularly to the axial direction of the drive device and thus of the first planetary gear set. It can be seen that the first planetary gear set has the first planetary gear bolts. A respective first planetary gear of the first planetary gear set is rotatably mounted on the respective first planetary gear bolt. In particular, the respective, first planetary gear is arranged on the respective, first planetary gear bolt on which the respective, first planetary gear is rotatably mounted, such that, for example, the respective, first planetary gear is rotatably mounted on the respective, first planetary gear bolt on which the respective, first planetary gear is rotatably mounted. The respective first planetary gear is thus allocated to the respective first planetary gear pin on which the respective first planetary gear is rotatably mounted and vice versa. Thus, the respective, first planetary gear can rotate around a respective, first planetary gear axis of rotation relative to the respective, allocated, first planetary gear bolt on which the respective, first planetary gear is rotatably mounted, wherein the respective, first planetary gear can rotate around the respective, corresponding, first planetary gear axis of rotation relative to the first planetary gear as a whole. Here, it is provided, in particular, that the respective first planetary gear axis of rotation is spaced apart from the first planetary gear axis of rotation in the radial direction of the first planetary gear set and the electronic drive device, in particular towards the outside, wherein it is preferably provided that the respective first planetary gear axis of rotation extends in parallel to the first planetary gear axis of rotation. In particular, it is conceivable that the first planetary gear axes of rotation are spaced apart from one another in the peripheral direction of the first planetary gear set extending around the axial direction of the first planetary gear set, in particular in pairs, in particular in such a way that the first planetary gear axes of rotation are arranged evenly distributed in the peripheral direction of the first planetary gear set and are thus equally spaced apart from one another in pairs. For example, the first planetary gear axes of rotation are arranged on a common circle, in particular an imaginary circle, the center of which preferably lies on the first planetary gear set axis of rotation.

Furthermore, it is provided in an inherently known manner that a first oil channel through which oil can flow is arranged within a housing wall of the equalizing housing. This means that the first oil channel extends within the housing wall of the equalizing housing and is thus delimited completely peripherally in the peripheral direction of the first oil channel and directly by the housing wall, in particular by an inner peripheral lateral surface of the housing wall. During operation of the electric drive device, the oil flows through the first oil channel in a flow direction also referred to as the oil flow direction, wherein the peripheral direction of the first oil channel runs around the oil flow direction. Thus, the oil touches the inner peripheral surface of the housing wall directly on its way through the first oil channel. A second oil channel is arranged within a web cheek of the first planetary carrier, which thus extends within the web cheek of the planetary carrier. Thus, the second oil channel in particular is delimited completely peripherally in the peripheral direction of the second oil channel and directly by the web cheek, in particular by an inner peripheral lateral surface of the web cheek. During operation of the drive device the oil flows through the second oil channel in a second flow direction, also referred to as the second oil flow direction, wherein the peripheral direction of the second oil channel runs around the second oil flow direction. Thus, the oil directly touches the web cheek, in particular the inner peripheral lateral surface of the web cheek, on its way through the second oil channel. The web cheek and the housing wall are formed as solid bodies. The second oil channel is directly fluidically connected to the first oil channel and vice-versa, such that, for example, during operation of the drive device, the oil firstly flows through one of the oil channels, in particular the first oil channel, and then through the other oil channel, in particular the second oil channel, and in particular when the oil flows out of one oil channel, the oil flows immediately and thus directly into the other oil channel, such that no other, further oil channel is arranged or runs between the oil channels. Due to the inherently known design of the electric drive device, a particularly advantageous feed of the oil, also referred to as oil feed, can be realized such that at least one partial region of the drive device can be efficiently and effectively supplied with the oil, which functions or is designed in particular as a coolant and/or lubricant. As a result, losses can be kept particularly low. In particular, the oil can be fed to the partial region with only a small number of parts and thus in a space-saving, weight-saving, and cost-effective manner, such that the costs, the installation space requirement and the weight of the drive device can be kept to a particularly low level. As a result, loss optimization, i.e., loss reduction, can be achieved compared to conventional solutions, such that particularly low-loss and thus particularly efficient operation of the electric drive device can be achieved. In particular, the web cheek of the planetary carrier is to be understood as such a wall from which the respective first planetary gear bolt extends away in the axial direction of the first planetary gear set. In other words, for example, the respective first planetary gear bolt protrudes from the web cheek in the axial direction of the first planetary gear set. In particular, it is here conceivable that the respective first planetary gear bolt is formed separately from the web cheek and is connected to the web cheek, in particular in such a way that the respective first planetary gear bolt is connected to the web cheek in a rotationally fixed manner. In particular, the respective first planetary gear bolt is connected to the web cheek in such a way that relative movements running in the axial direction of the first planetary gear set between the respective first planetary gear bolt and the web cheek are avoided. In particular, compared to conventional solutions, components, and/or assemblies can be combined such that the number of parts and thus the costs, the weight and the installation space requirement can be kept to a particularly low level. Moreover, the invention creates a prerequisite for creating an advantageous bearing concept in order to keep losses particularly low. Moreover, targeted and needs-based lubrication and/or cooling can be achieved by means of the oil. The invention also makes it possible to separate wheelset lubrication and disc oiling. In particular, wheelset lubrication is to be understood to mean supplying the first planetary gear set with oil. Disc oiling is to be understood to mean, for example, supplying the oil to the discs of a disc switching element. The disc switching element is, for example, a frictional, i.e., non-positive, switching element by means of which at least two components, for example, of the drive device can be connected to each other in a rotationally fixed manner.

According to the invention, the electric drive device comprises a second planetary gear set arranged in the housing, which is arranged coaxially to the rotor. The second planetary gear set has a second sun gear, a second planetary carrier, and a second ring gear. The second sun gear, the second planetary carrier, and the second ring gear are second elements of the second planet gear set or are also referred to as second elements. For example, second planetary gears of the second planetary gear set are rotatably mounted on the second planetary carrier. The respective first planetary gear is in engagement with both the first sun gear and the first ring gear, in particular simultaneously. The respective second planetary gear is, for example, in engagement with the second sun gear and with the second ring gear, in particular simultaneously. In particular when the respective second element is not connected to the housing in a rotationally fixed manner, the respective second element can be rotated around a second planetary gear set axis of rotation relative to the housing. Preferably, the planetary gear sets are arranged coaxially to one another such that the second planetary gear set axis of rotation preferably coincides with the first planetary gear set axis of rotation or vice-versa. In particular, the planetary gear set axes of rotation coincide with a main axis of rotation around which the respective first or second element, which is not connected to the housing in a rotationally fixed manner, can be rotated relative to the housing. Since the second planetary gear set is arranged coaxially to the rotor, the second planetary gear set axis of rotation coincides with the machine axis of rotation. According to the invention, the second sun gear is coupled or can be coupled to the first ring gear in a rotationally fixed manner. In other words, it is conceivable that the second sun gear is coupled, in particular permanently, to the first ring gear in a rotationally fixed manner, i.e., is connected. Furthermore, it is conceivable that the second sun gear can be connected to the first ring gear in a rotationally fixed manner. Thus, for example, a first switching element is provided, which can be switched between a first coupling state and a first decoupling state. For example, the first switching element can be moved, in particular relative to the housing and/or translationally, between at least one first coupling position, which brings about the first coupling state, and at least one first decoupling position, which brings about the first decoupling state. In the first coupling state, the second sun gear is connected to the first ring gear in a rotationally fixed manner by means of the first switching element. In the first decoupling state, the first switching element releases the second sun gear for rotation around the main axis of rotation and relative to the first ring gear. According to the invention, the second ring gear is coupled or can be coupled to the first planetary carrier in a rotationally fixed manner. In other words, for example, the second ring gear is coupled, in particular permanently, to the first planet carrier in a rotationally fixed manner, i.e., connected. Alternatively, for example, the second ring gear can be connected to the first planetary carrier in a rotationally fixed manner. Thus, for example, a second switching element is provided, which can be switched between a second coupling state and a second decoupling state. For example, the second switching element can be moved, in particular relative to the housing and/or translationally, between at least one second coupling position that brings about the second coupling state and at least one second decoupling position that brings about the second decoupling state. In the second coupling state, the second ring gear is connected to the first planetary carrier by means of the second switching element in a rotationally fixed manner. In the second decoupling state, the second switching element releases the second ring gear for rotation around the main axis of rotation and relative to the first planetary carrier such that the second ring gear and the first planetary carrier can be rotated relative to each other around the main axis of rotation in the second decoupling state.

According to the invention, the equalizing housing has an oil outlet opening through which the oil can flow, which is fluidically connected to the first oil channel and is thus, for example, an outlet opening of the first oil channel. According to the invention, the oil outlet opening is arranged axially, i.e., in the axial direction of the respective planetary gear set and thus viewed along the main axis of rotation, on a side of the second planetary gear set facing away from the first planetary gear set. Thus, for example, the first oil channel opens via the oil outlet opening into the surroundings of the equalizing housing that is different in particular from the second oil channel, such that, for example, the oil can be discharged, i.e., led out, from the first oil channel and in particular from the equalizing housing as a whole via the oil outlet opening. Thus, a particularly advantageous, low-loss and needs-based guide of the oil can be realized.

In the context of the present disclosure, the feature that two components, such as the first sun gear and the input shaft, for example, are connected to each other in a rotationally fixed manner is to be understood to mean that the components connected to each other in a rotationally fixed manner are arranged coaxially to one another and, in particular when the components are driven, rotate together or simultaneously around a component axis of rotation common to the components, such as the first planetary gear set axis of rotation, for example, at the same angular speed, in particular relative to the housing. The feature that two components are connected to each other in a torque-transmitting manner is to be understood to mean that the components are coupled to each other in such a way that torques can be transmitted between the components, wherein when the components are connected to each other in a rotationally fixed manner, the components are also connected to each other in a torque-transmitting manner. The feature that two components are permanently connected to each other in a torque-transmitting manner is to be understood to mean that a switching element is not provided that can be switched between a coupling state that connects the components to each other in a torque-transmitting manner and a decoupling state in which no torques can be transmitted between the components via the switching element, but rather the components are constantly or always and thus permanently connected to each other in a torque-transmitting manner, i.e., in such a way that a torque can be transmitted between the components. Thus, for example, one of the components can be driven by the other component or vice-versa. In particular, the feature that the components are permanently connected to each other in a rotationally fixed manner means that a switching element is not provided which can be switched between a coupling state connecting the components to each other in a rotationally fixed manner and a decoupling state in which the components are decoupled from each other and can be rotated relative to each other, such that no torques can be transmitted between the components via the switching element, but rather the components are constantly or always, i.e., permanently, connected or coupled to each other in a rotationally fixed manner.

The feature that two components can be connected to each other in a rotationally fixed or torque-transmitting manner is to be understood to mean, in particular, that a switching element is allocated to the components, said switching element being able to be switched between at least one coupling state and at least one decoupling state. In the coupling state, the components are connected to each other by means of the switching element in a rotationally fixed or torque-transmitting manner. In the decoupling state, the components are decoupled from one another, such that in the decoupling state the components can be rotated relative to one another, in particular around the component axis of rotation, and in particular such that no torques can be transmitted between the components via the switching element. A rotationally fixed connection of an element to the housing is to be understood to mean that the element is connected to the housing in such a way that it cannot be rotated or twisted relative to the housing. In particular, "rotationally fixed" is thus to be understood as follows: Two elements are connected to each other in a rotationally fixed manner when they are arranged coaxially to each other, in particular in relation to their axis of rotation or in relation to an axis of rotational symmetry, and when they are connected to each other in such a way that they always rotate at the same angular speed. An element is connected to the housing in a rotationally fixed manner when it cannot be twisted relative to the housing. "Radially overlapping" is to be understood, in particular, to mean the following: Two, in particular at least substantially rotationally symmetrical, elements are arranged to radially overlap in relation to a common axis, such as an axis running in a radial direction and, for example, in the form of a straight line, for example, when they are arranged at least partially in a range of identical radial coordinates, i.e., coordinates relating to the radial direction of the drive device, in particular identical angular coordinates. In particular, "axially overlapping" is to be understood to mean as follows: Two elements are arranged axially overlapping with respect to a common axis which, for example, runs in the axial direction of the drive device and is formed in particular as a straight line, i.e., are arranged at least partially in a region of the same axial coordinates, i.e., coordinates relating to the axial direction of the drive device. In particular, "radially within" is to be understood to mean as follows: A first element is arranged radially within a second element, in particular in relation to a common axis, when the first element is arranged in a region of smaller radii than the second element. Accordingly, "radially outside" in particular is to be understood to mean as follows: A first element is arranged radially outside a second element, in particular in relation to a common axis, when the first element is arranged in a region of larger radii than the second element, wherein in particular the respective radius runs in the radial direction of the drive device.

In order to be able to realize particularly low-loss and thus efficient operation, it is provided in an embodiment of the invention that the web cheek is formed in one piece with the equalizing housing. This means that the web cheek is formed in one piece with the equalizing housing. By this it is to be understood that the web cheek and the equalizing housing are not components formed separately from each other and connected to each other, but rather the web cheek and the equalizing housing are formed from a single piece, i.e., formed as a monobloc or formed by a monobloc. In other words again, it is preferably provided that the web cheek and the equalizing housing are formed by a body which is designed integrally and thus formed from a single piece, which is thus produced integrally.

Here, it has been shown to be particularly advantageous when the web cheek and the equalizing housing are formed by a one-piece, i.e., single-piece, cast component. In other words, it is thus preferably provided that the aforementioned body or monobloc is formed as a cast component, i.e., manufactured by casting, i.e., by a casting process. Thus, the number of parts and the costs as well as the weight and the installation space requirement can be kept particularly low, such that particularly efficient operation can be realized.

A further embodiment is characterized in that internal spaces of the first planetary gear bolts of the first planetary carrier are fluidically connected directly to the second oil channel. In other words, the respective first planetary gear bolt has an inner chamber which is produced and formed, for example, by drilling, i.e., is formed in as a bore. In particular, drilling is to be understood as machining processing, i.e., machining drilling. The respective inner chamber is immediately, i.e., directly, fluidically connected to the second oil channel. The respective inner chamber is also referred to as the fourth oil channel, for example, or is a fourth oil channel. Thus, the oil flows on its way through the second oil channel through the fourth oil channel, for example, first through the second oil channel and then through the fourth oil channel or vice-versa, wherein the oil flowing out of the second oil channel, for example, flows directly and thus immediately into the respective fourth oil channel (inner chamber). Thus, no other further oil channel is arranged between the respective fourth oil channel (inner chamber) and the second oil channel. Thus, a particularly effective and efficient guide of the oil is realized.

For example, the respective planetary gear bolt, also known simply as the planetary bolt, has a fifth oil channel through which the oil can flow and which is fluidically connected, in particular immediately or directly, to the respective inner chamber. Thus, for example, the oil flows on its way through the respective fourth oil channel (inner chamber) and through the respective fifth oil channel, for example first through the respective fourth oil channel (inner chamber) and then through the respective fifth oil channel or vice versa, wherein the oil flowing out of the respective fourth oil channel flows, in particular directly, into the respective fifth oil channel or vice-versa. Very preferably, the respective fifth oil channel runs in the radial direction of the respective first planetary gear bolt. For example, the respective fifth oil channel is formed as a bore, i.e., produced by drilling. For example, the respective first planetary gear is rotatably mounted on the respective allocated first planetary gear bolt via a respective bearing. The respective bearing is formed, for example, as a friction bearing or as a roller bearing, in particular as a needle bearing, whereby a particularly low-loss bearing can be realized. In particular, it is here conceivable that the respective bearing, via which the respective first planetary gear is rotatably mounted on the respective allocated first planetary gear bolt, can be supplied with the oil via the fifth oil channel, i.e., can be supplied with the oil from the respective fifth oil channel, in order to thus lubricate and/or to cool the respective bearing. Here, the invention enables a particularly low-loss and thus efficient supply of the oil to the respective bearing, whereby losses can be kept particularly low. Supplying the respective bearing with the oil is also referred to as lubricating or oiling the respective bearing, whereby the oiling can be realized particularly efficiently.

A further embodiment is characterized by a radial bearing, which is formed, for example, as a roller bearing or as a friction bearing. The radial bearing is arranged axially, i.e., in the axial direction of the drive device and thus of the first planetary gear set and thus along the first planetary gear set axis of rotation, also referred to as the main axis of rotation, between a wall of the housing, also referred to as the second housing wall or wall, and the first planetary gear set, wherein the radial bearing is formed for radial bearing of the first planetary carrier relative to the housing. In other words, the first planetary carrier is rotatably mounted on the housing via the radial bearing in the radial direction of the first planetary gear set and thus of the drive device. In doing so, a particularly low-loss operation can be realized.

Here, it has been shown to be particularly advantageous when the second sun gear is arranged axially overlapping with the equalizing housing, wherein an internal diameter of the second sun gear is larger than the largest external diameter of the equalizing housing. Thus, in particular, at least one longitudinal region of the equalizing housing running in the axial direction of the drive device is arranged in the second sun gear and is thus surrounded by the second sun gear in the peripheral direction of the second planetary gear set and the equalizing housing running around the main axis of rotation, in particular completely peripherally. Thus, a particularly compact and thus low-loss design of the drive device can be realized.

In a further, particularly advantageous embodiment of the invention, a first axial bearing is provided, via which the second sun gear is rotatably supported axially on the second planetary carrier and is thus mounted. Also provided is a second axial bearing arranged axially, i.e., in the axial direction of the drive device, adjacent to the first axial bearing, via which the second planetary carrier is rotatably supported axially against the second ring gear and/or the equalizing housing. For example, the respective axial bearing is formed as a friction bearing or as a roller bearing. In doing so, a particularly low-loss bearing can be realized.

In order to be able to realize a particularly advantageous and thus needs-based and low-loss guide of the oil, it is provided in a further design of the invention that a third oil channel through which the oil can flow extends axially between at least one first part of the first axial bearing and at least one second part of the second axial bearing. A respective bearing, by means of which or via which the respective second planetary gear is rotatably mounted on the second planetary carrier, can be supplied with the oil via the third oil channel, whereby the bearing of the respective second planetary gear can be cooled and/or lubricated. The respective bearing of the respective second planetary gear is or comprises a bearing element, formed, for example, as a roller bearing or friction bearing, also simply referred to as a bearing, which can be advantageously lubricated and/or cooled by means of the oil.

Finally, it has shown to be particularly advantageous when the largest outer radius of the first planetary gear set is arranged radially within the largest outer radius of the second planetary gear set, such that a particularly compact and thus low-loss design can be achieved.

A second aspect of the invention relates to a motor vehicle, also simply referred to as a vehicle, which is preferably formed as a car. The motor vehicle has an electric drive device according to the first aspect of the invention, wherein the motor vehicle can be driven electrically by means of the electric drive device, in particular exclusively so. Advantages and advantageous designs of the first aspect of the invention are to be regarded as advantages and advantageous designs of the second aspect of the invention, and vice versa.

Further advantages, features, and details of the invention emerge from the following description of preferred exemplary embodiments and by means of the drawings. The features and combinations of features mentioned above in the description, and the features and combinations of features mentioned below in the description of the figures and/or shown alone in the figures, can be used not only in the respectively specified combinations, but also in other combinations or on their own, without leaving the scope of the invention.

BRIEF DESCRIPTION OF THE DRAWING FIGURES

Figure 2:
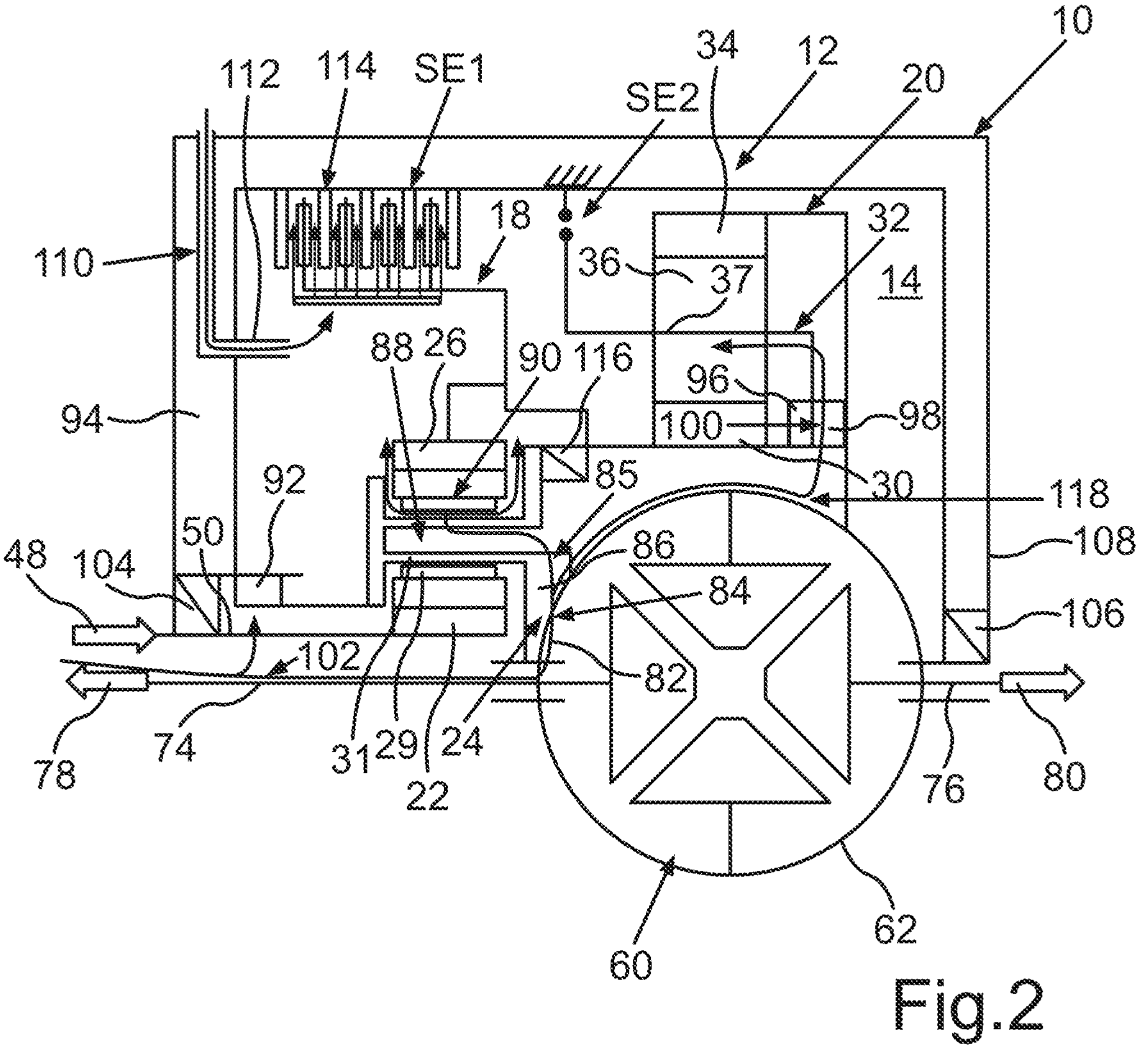
Figure 3:
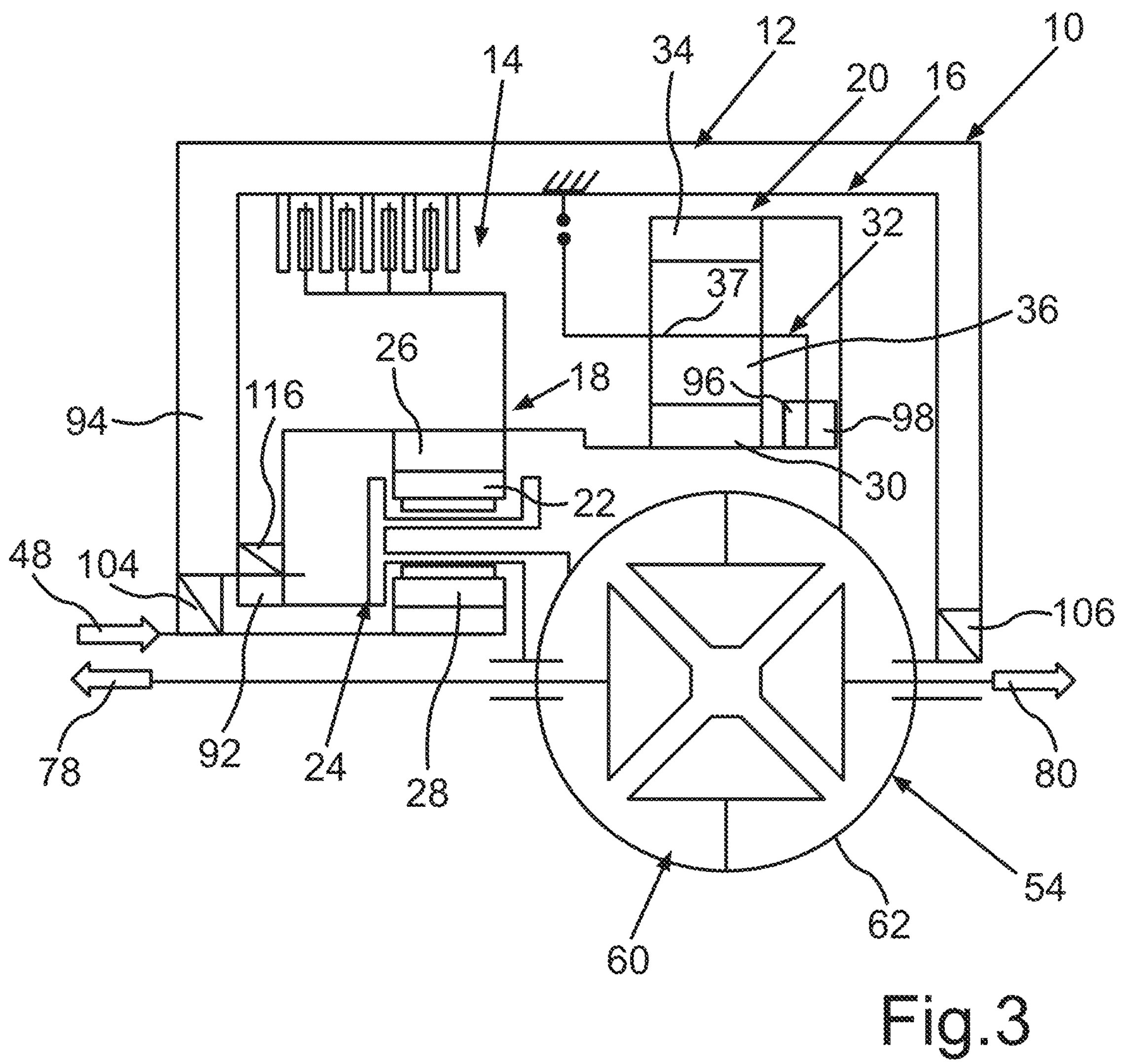

The drawings show in:

FIG. 1, in sections, a schematic depiction of a first embodiment of an electric drive device for a motor vehicle;

FIG. 2, in sections, a schematic depiction of a second embodiment of the drive device; and FIG. 3, in sections, a schematic depiction of a third embodiment of the drive device.

DETAILED DESCRIPTION

In a schematic depiction, FIG. 1 shows, in sections, a first embodiment of an electric drive device 10 for a motor vehicle, in particular for a car such as a passenger car, for example. The motor vehicle, also simply referred to as a vehicle, is, for example, an electric vehicle, in particular a battery-electric vehicle, and can be driven electrically, in particular exclusively or purely so. Here, the motor vehicle can be driven electrically, in particular exclusively so, by means of the drive device 10. The electric drive device 10 comprises a housing 12, depicted particularly schematically in FIG. 1, which delimits, in particular directly, a receiving chamber 14, also referred to as a receiving region. Moreover, the electric drive device 10 comprises a planetary transmission 16, which is arranged or received in the housing 12 and thus in the receiving chamber 14. The planetary transmission 16 and thus the drive device 10 comprises a first planetary gear set 18 and a second planetary gear set 20, which are arranged coaxially to one another in the first embodiment. The first planetary gear set 18 has a first sun gear 22, a first planetary carrier 24, and a first ring gear 26. The sun gear 22, the planetary carrier 24, and the ring gear 26 are first elements of the first planetary gear set 18 or are also referred to as first elements of the first planetary gear set 18. Moreover, the first planetary gear set 18 comprises first planet gears, of which a planet gear labelled with 28 can be seen in FIG. 1. The designs above and below regarding the first planetary gear 28 can also be readily applied to the other, remaining first planetary gears, and vice versa. The planetary gear 28 is rotatably mounted on the planetary carrier 24, in particular via at least or exactly one respective first bearing 29 (FIG. 2), and simultaneously meshes with the sun gear 22 and with the ring gear 26. From FIG. 2, it can be seen that a respective first planetary gear bolt 31 of the first planetary carrier 24 is allocated to the respective first planetary gear 28, wherein the respective first planetary gear bolt 31 is also referred to as the first planetary bolt. The respective first planetary gear 28 is rotatably mounted on the respective allocated first planetary gear bolt 31 via the respective first bearing 29. For example, the respective first bearing 29 is a friction bearing or a roller bearing, in particular a needle bearing.

The second planetary gear set 20 has a second sun gear 30, a second planetary carrier 32, and a second ring gear 34. The sun gear 30, the planetary carrier 32, and the ring gear 34 are second elements of the second planetary gear set 20 or are also referred to as second elements of the second planetary gear set 20. The sun gears 22 and 30, the planetary carriers 24 and 32, the ring gears 26 and 34, and the housing 12 are also referred to as components of the drive device 10. Here, the planetary gear sets 18 and 20 are thus received or arranged in the receiving chamber 14 and thus in the housing 12. Moreover, the second planetary gear set 20 comprises second planetary gears, of which a second planetary gear, labelled with 36, can be seen in FIG. 1. The statements above and below about the second planetary gear 36 can also be readily applied to the other second planetary gears, and vice versa. The respective second planetary gear 36 is rotatably mounted on the second planetary carrier 32 and simultaneously meshes with the sun gear 30 and with the ring gear 34. The planetary carriers 24 and 32 are also referred to as webs.

From FIG. 1 it can be seen that a respective second planetary gear bolt 37 of the second planetary carrier 32 is allocated to the respective second planetary gear 36, wherein the respective second planetary gear bolt 37 is also referred to as the second planetary bolt. Here, the respective second planetary gear 36 is rotatably mounted on the respective allocated second planetary gear bolt 37, in particular via at least or exactly one respective second bearing. For example, the respective second bearing is a respective second friction bearing or a respective second roller bearing, in particular a needle bearing. In particular when the respective first element is not connected to the housing 12 in a rotationally fixed manner, the respective first element can rotate relative to the housing 12 around a main axis of rotation 38 common to the planetary gear sets 18 and 20, wherein the main axis of rotation 38 runs in the axial direction of the respective planetary gear set 18, 20, in particular coincides with the respective axial direction of the respective planetary gear set 18, 20 and thus of the electric drive device 10 as a whole. Alternatively or additionally, for example, at least two of the components can rotate around the main axis of rotation 38, in particular relative to one another when the two components are not connected to each other in a rotationally fixed manner. If, for example, two of the components are connected to each other in a rotationally fixed manner or are coupled to each other in a rotationally fixed manner, then the components connected to one another in a rotationally fixed manner are secured against rotation around the main axis of rotation 38 and relative to one another. If, for example, two of the elements are connected or coupled to each other in a rotationally fixed manner, and the planetary gear sets 18 and 20 are driven, then the elements connected in a rotationally fixed manner rotate together and thus as a block around the main axis of rotation 38, in particular relative to the housing 12. This means that the elements connected in a rotationally fixed manner then rotate as a block. If, for example, the respective element is connected or coupled to the housing 12 in a rotationally fixed manner, then the respective element is secured against rotation relative to the housing 12 and around the main axis of rotation 38, such that the respective element connected in a rotationally fixed manner to the housing 12 cannot rotate relative to the housing 12 around the main axis of rotation 38.

In the first embodiment shown in FIG. 1, the first ring gear 26 is permanently connected in a rotationally fixed manner to the second sun gear 30. Moreover, the first planetary carrier 24 is permanently connected in a rotationally fixed manner to the second ring gear.

Moreover, the drive device 1 comprises an electric engine 40, depicted particularly schematically in FIG. 1, by means of which the motor vehicle can be driven electrically, in particular exclusively so. The motor vehicle has, for example, at least or exactly two vehicle axles, arranged one after the other and thus one behind the other in the longitudinal direction of the vehicle, also simply referred to as axles. The respective vehicle axle has at least or exactly two respective vehicle wheels, which are also simply referred to as wheels and are arranged, for example, on opposite sides of the motor vehicle in the transverse direction of the motor vehicle. The vehicle wheels are ground contact elements of the motor vehicle, which can be or is supported downwards on a ground in the vertical direction of the motor vehicle via the drive device. By means of the drive device 10, for example, the vehicle wheels of at least or exactly one of the vehicle axles can be driven, wherein the vehicle wheels that can be driven by means of the drive device 10 are also referred to as drive wheels. The vehicle wheels that can be driven by means of the drive device 10 and also referred to as drive wheels are shown particularly schematically in FIG. 1 and labelled with 41 and 43. The vehicle axle comprising the vehicle wheels 41 and 43 is labelled with 45. By electrically driving the vehicle wheels 41 and 43, the motor vehicle as a whole can be driven electrically, in particular exclusively so. To do so, the electric engine 40 comprises a stator 42, depicted particularly schematically in FIG. 1, and a rotor 44, which can be driven by the stator 42 and can thus be rotated around a machine axis of rotation 46 relative to the housing 12 and relative to the stator 42. In the first embodiment, the electric engine 40 and the planetary gear sets 18 and 20 are arranged coaxially to one another, such that the main axis of rotation 38 common to the planetary gear sets 18 and 20 coincides with the machine axis of rotation 46. The electric engine 40 can be operated in an engine operation and thus as an electric motor. In the engine operation, the stator 42 drives the rotor 44, whereby the rotor 44 is rotated relative to the stator 42 around the machine axis of rotation 46. Via the rotor 44, the electric engine can also provide torques referred to as drive torques, by means of which the vehicle wheels 41 and 43 can be driven electrically, in particular exclusively so. The respective drive torque provided or that can be provided by the electric engine 40 via the rotor 44 for electrically driving the vehicle wheels 41 and 43 is illustrated in FIG. 1 by an arrow 48.

The drive device 10 has an input shaft 50, which can be driven by the rotor 44. For this purpose, the input shaft 50 is connected, for example, in particular permanently, in a torque-transmitting, in particular rotationally fixed, manner to the rotor 44. Furthermore, it is conceivable for the input shaft 50 to be able to be connected to the rotor 44 in a torque-transmitting, in particular rotationally fixed, manner. In particular, the input shaft 50 is formed separately from the rotor 44 and is connected or can be connected to the rotor 44 in a torque-transmitting, in particular rotationally fixed, manner, permanently. It can be seen that the input shaft 50 is arranged coaxially to the planetary gear sets 18 and 20 and can thus be rotated around the main axis of rotation 38 relative to the housing 12. In other words, the input shaft 50 can be rotated around an input shaft axis of rotation relative to the housing 12, wherein in the first embodiment, the input shaft axis of rotation coincides with the main axis of rotation 38. The input shaft 50 is, for example, an input shaft of the planetary transmission 16.

The drive device 10, in particular the planetary transmission 16, has an output shaft 52 that can be rotated relative to the housing 12, in particular around the main axis of rotation 38. For example, the respective drive torque or a respective first torque resulting from the respective drive torque can be introduced into the planetary transmission 16 via the input shaft 50. Via the output shaft 50, the planetary transmission 16 can provide a respective second torque resulting from the respective drive torque or from the respective first torque, which can thus be dissipated or discharged from the planetary transmission 16 via the output shaft 50.

Moreover, the drive device 10 comprises a differential transmission 54, also simply referred to as a differential. The differential transmission 54 is allocated, for example, to the vehicle axle 45 and is thus also referred to as an axle gear. For example, the vehicle wheels 41 and 43 of the vehicle axle 45 can be driven by the electric engine 40, in particular the rotor 44, via the differential transmission 54. Here, the differential transmission 54 has the function, in particular, of transmitting the respective torque provided or that can be provided by the electric engine 40 via the rotor 44 or the respective second torque provided or that can be provided by the output shaft 50 to the vehicle wheels 41 and 43 and dividing or distributing it in order to thereby drive the vehicle wheels 41 and 43. Here, the differential transmission 54 can be driven by the output shaft 52 or, via the output shaft 52, by the planetary transmission 16, as will be explained in more detail below.

The drive device 10 has a first switching element SE1, by means of which the first ring gear 46 can be connected in a rotationally fixed manner to the housing 12. For example, the first switching element SE1 can be designed as a force- or friction-locking switching element and, for example, here as a friction brake, wherein the friction brake can also be referred to, for example, as a disc brake and can, for example, have several friction discs, also referred to as discs. Moreover, the drive device 10 has a second switching element SE2, by means of which, in the first embodiment, the second planetary carrier 32 can be connected in a rotationally fixed manner to the housing 12. In the first embodiment, the planetary gear sets 18 and 20 are arranged coaxially with the differential transmission 54.

The differential transmission 54 has a bevel gear differential 60, which has an equalizing housing 62. For example, the equalizing housing is a differential basket, also referred to as a differential cage. In the first embodiment, for example, the output shaft 52 is connected, in particular permanently, in a rotationally fixed manner to the equalizing housing 62, such that in the first embodiment, the planetary carrier 24 and the ring gear 34 are connected, in particular permanently, in a rotationally fixed manner to the equalizing housing 62. Thus, the respective second torque provided or that can be provided by the output shaft 52 can be transmitted to the equalizing housing 62 and thus to the differential transmission 54 and thus introduced into the equalizing housing 62 and thus into the differential transmission 54. The equalizing housing 62 can be rotated relative to the housing 12 around a differential transmission axis of rotation, also referred to as the equalizing axis of rotation, equalizing housing axis of rotation, or differential axis of rotation. In the first embodiment, the differential transmission axis of rotation coincides with the main axis of rotation 38, such that the equalizing housing 62 can be rotated around the main axis of rotation 38 relative to the housing 12.

The equalizing housing 62, in particular an inner peripheral lateral surface 63 of the equalizing housing 62, forms or delimits, in particular directly, a receiving chamber 64, also referred to as a receiving region. For example, the receiving chamber 64 can be spherical or spherical segment shaped. The bevel gear differential 60 has two equalizing gears 66 and 68 rotatably mounted on the equalizing housing 62, which can be rotated around a common equalizing gear axis of rotation 69 relative to one another and relative to the equalizing housing 62. The equalizing gear axis of rotation 69 runs perpendicularly to the main axis of rotation 38. Furthermore, the bevel gear differential 60 has two output gears 70 and 72, which can be rotated, in particular relative to the equalizing housing 62, and which can be rotated, for example, around a common output gear axis of rotation relative to one another and relative to the equalizing housing 62. For example, the output gear axis of rotation coincides with the main axis of rotation 38. The equalizing gears 66 and 68 and the output gears 70 and 72 are toothed gears which are formed as bevel gears. The output gears 70 and 72 mesh simultaneously with the equalizing gears 66 and 68. The toothed gears are arranged at least partially, in particular at least predominantly and thus at least more than half or completely, in the receiving chamber 64.

The drive device 10 has a first side shaft 74 and a second side shaft 76. The side shafts 74 and 76 are formed, for example, as cardan shafts. The side shaft 74 can be driven by the output gear 70, for example, by the side shaft 74 being connected, in particular permanently, in a rotationally fixed manner to the output gear 70. The side shaft 76 can be driven by the output gear 72, for example, by the second side shaft 76 being connected, in particular permanently, in a rotationally fixed manner to the output gear 72. From FIG. 1, it can be seen that the vehicle wheel 41 can be driven by the side shaft 74, and the vehicle wheel 43 can be driven by the side shaft 76.

In FIG. 1, respective arrows 78 and 80 illustrate a respective third torque resulting from the respective second torque introduced into the differential transmission 54. In particular, the vehicle wheel 41 can be driven by means of the third torque illustrated by the arrow 78; for example, the vehicle wheel 43 can be driven by means of the third torque illustrated by the arrow 80. In particular, the arrows 78 and 80 illustrate that the differential transmission 54, in particular the bevel gear differential 60, divides or distributes the respective second torque to the side shafts 74 and 76 and thus to the vehicle wheels 41 and 43 and thus transmits it, such that the vehicle wheels 41 and 43 can be driven by the differential transmission 54, in particular the bevel gear differential 60, via the side shafts 74 and 76.

A torque transmission path or torque flow, along which the respective drive torque can be transmitted to the respective vehicle wheel 41, 43, branches off, for example, at the differential transmission 54 or is branched off by the differential transmission 54, that is into a first branch and a second branch, wherein the respective drive torque can be transmitted to the vehicle wheel 41 via the first branch and to the vehicle wheel 43 via the second branch. Thus, the side shaft 74 and the vehicle wheel 41 are arranged in the first branch, and the side shaft 76 and the vehicle wheel 43 are arranged in the second branch. In the flow direction of the respective drive torque streaming or flowing from the rotor 44 along the torque transmission path to the respective vehicle wheel 41, 43, the respective side shaft 74, 76 is arranged in the torque transmission path and here upstream of the respective vehicle wheel 41, 43 and downstream of the bevel gear differential 60. Thus, the side shaft 74 is arranged between the vehicle wheel 41 and the differential transmission 54, and the side shaft 76 is arranged between the vehicle wheel 43 and the differential transmission 54 or the bevel gear differential 60. Here, the first side shaft 74 arranged between the differential transmission 54 and the vehicle wheel 41 forces through, i.e., penetrates, the rotor 44. Furthermore, it is provided that the first sun gear 22 is arranged axially, i.e., in the axial direction of the respective planetary gear set 18, 20 and thus the drive device 10, adjacent to the equalizing housing 62.

In order to be able to achieve particularly low-loss and thus particularly efficient operation, it is moreover provided that the largest outer radius of the equalizing housing 62, running in the radial direction of the respective planetary gear set 18, 20 and thus of the drive device 10, lies radially outside the first planetary gear bolts 31 of the first planetary carrier 24. Moreover, it is provided that a first oil channel 84, arranged within a housing wall 82 (FIG. 2) of the equalizing housing 62, i.e., running and flowed through by oil, is directly fluidically connected to a second oil channel 85, which is arranged, i.e., runs, within a web cheek 86 of the first planetary carrier 24. The oil is a liquid which is used as a lubricant and/or coolant for lubricating and/or cooling at least one or more, in particular spaced-apart, regions of the drive device 10.

In principle, it is conceivable for the web cheek 86 and the equalizing housing 62 to be formed separately from one another and connected to one another in a rotationally fixed manner. However, it has shown to be particularly advantageous when the web cheek 86 is formed as a single piece, i.e., integrally with the equalizing housing 62, such that the web cheek 86 and the equalizing housing 62 are preferably formed from a single piece. Here, it has shown to be particularly advantageous when the web cheek 86 and the equalizing housing 62 are formed from a single, i.e., one-piece, cast component.

From FIG. 2 it can be seen that the respective first planetary gear bolt 31 has a respective inner chamber 88, which is also referred to, for example, as a fourth oil channel or is a fourth oil channel. For example, the respective inner chamber 88 is designed as a bore. The respective inner chamber 88 can be flowed through by the oil. From FIG. 2 it can be seen that the respective inner chamber 88 of the respective first planetary gear bolt 31 is directly fluidically connected to the second oil channel 85. In FIG. 2, arrows illustrate flows of the oil. As can be seen from the arrows, the oil can, for example, flow through the side shaft 74, in particular a fifth oil channel running within the side shaft 74, wherein, for example, the oil can flow from the fifth oil channel into the first oil channel 84, for example by the fifth oil channel being, in particular immediately and thus directly, fluidically connected to the first oil channel 84. The oil can then flow through the first oil channel 84. The oil flowing through the oil channel 84 can flow out of the first oil channel 84 and thus, in particular immediately and thus directly, flow into the second oil channel 85 and subsequently flow through the respective second oil channel 85. The oil flowing through the respective second oil channel 85 can flow out of the respective second oil channel 85 and, in particular directly and thus immediately, flow into the respective fourth oil channel (inner chamber 88) and subsequently flow through the respective inner space 88.

From FIG. 2 it can be seen that the respective first planetary gear bolt 31 has a respective sixth oil channel 90 through which the oil can flow. For example, the respective sixth oil channel 90 is formed as a bore. It can be seen that the respective sixth oil channel 90 runs in the radial direction of the respective first planetary gear bolt 31 and thus oil can flow through in the radial direction of the respective first planetary gear bolt 31. The respective bearing 29 can be supplied with the oil flowing through the respective sixth oil channel 90 via the respective sixth oil channel 90. In other words, the respective bearing 29 can be supplied with the oil from the respective sixth oil channel 90, which is also referred to as lubricating or oiling of the respective bearing 29. In doing so, the respective bearing 29 can be lubricated and/or cooled. As can be seen from the arrows, the oil can, for example, flow out of the respective bearing 29 and, for example, subsequently flow along the respective first planetary gear bolt 31 and/or along the respective first planetary gear 28 and/or along the first sun gear 22 and/or along the first ring gear 26 and, for example, be thrown off the respective first planetary gear bolt 31 and/or from the respective first planetary gear 28 and/or from the first sun gear 22 and/or from the first ring gear 26, in particular in the radial direction of the first planetary gear set 18 and thus of the drive device 10 as a whole outwardly. The drive device 10 comprises a first radial bearing 92, which is arranged axially, i.e., in the axial direction of the respective planetary gear set 18, 20 and thus of the drive device 10 as a whole, between a housing wall 94 of the housing 12 and the first planetary gear set 18, which is arranged, for example, axially between the housing wall 54 and the second planetary gear set 20. The first planetary carrier 24 is rotatably mounted radially on the housing 12 via the first radial bearing 92.

The housing wall 94 here extends advantageously perpendicularly to the main axis of rotation 38.

In the first embodiment shown in FIG. 1 and in the second embodiment shown in FIG. 2, the second sun gear 30 is arranged axially overlapping the equalizing housing 62, wherein an inner diameter of the second sun gear 30 is larger than the largest outer diameter of the equalizing housing 62.

In the second embodiment, the electric drive device 10 comprises a first axial bearing 96, via which the second sun gear 30 is axially rotatably supported on the second planetary carrier 32. Also provided is a second axial bearing 98, arranged axially adjacent to the first axial bearing 96, via which the second planetary carrier 32 is axially rotatably supported against the equalizing housing 62 and the second ring gear 34. Here, a third oil channel 100, through which the oil flows, extends axially between at least one first part of the first axial bearing 96 and at least one second part of the second axial bearing 98, via which third oil channel the respective second bearing, also referred to as the bearing, by means of which the respective second planetary gear 36 is rotatably mounted on the respective associated or allocated second planet gear bolt 37, can be supplied with the oil. For example, the third oil channel 100 extends in the axial bearing 96 or in the axial bearing 98, or the oil channel 100 extends in a wall of the planetary carrier 32 arranged axially between the axial bearings 96 and 98 and arranged as a solid body. For example, a seventh oil channel, which is fluidically connected to the third oil channel, runs in the planetary carrier 32. The oil flowing through the third oil channel 100 can flow out of the third oil channel and flow into the seventh oil channel, and subsequently flow through the seventh oil channel and is guided to the respective second bearing via the seventh oil channel. For example, the oil can flow out of the respective seventh oil channel and subsequently be supplied to the respective second bearing, whereby the respective second bearing can be advantageously lubricated and/or cooled.

From FIG. 2, it can be seen that, for example, the side shaft 74, in particular its fifth oil channel, has at least one outlet opening 102. The oil can be discharged, in particular sprayed out, from the side shaft 74 via the outlet opening 102 and supplied to the radial bearing 92, in particular sprayed against and/or into the radial bearing 92. In doing so, the radial bearing 92 can be supplied with oil in a particularly advantageous manner, and thus lubricated.

Also provided, for example, is a second axial bearing 104, via which the input shaft 50 and thus, for example, the sun gear 22 are axially and rotatably supported, in particular mounted, on the housing wall 94. Also provided is a third axial bearing 106, via which, in the present case, for example, the equalizing housing 62 is axially and rotatably supported and thus mounted on the housing 12, in particular on a second housing wall 108 of the housing 12.

Moreover, from FIG. 2 it can be seen that, for example, a further oil channel 110 runs within the housing wall 94, said oil channel also being able to be referred to as an eighth oil channel and the oil being able to flow through said oil channel. A line element 112 delimiting at least one longitudinal region of the further oil channel 110 protrudes, for example, in the axial direction of the drive device 10 from the housing wall 94, in particular towards the respective planetary gear set 18, 20. The line element 112 forms a second outlet opening of the further oil channel 110. The oil flowing through the further oil channel 110 can exit from the further oil channel 110 and in particular from the line element 102 via the second outlet opening, in particular be sprayed out and in particular be sprayed against the discs labelled with 114 in FIG. 2 of the first switching element SE1, which is formed here as a disc switching element, whereby the discs 114 of the switching element SE1 can advantageously be supplied with the oil and can thus be lubricated and/or cooled.

Advantageously, the line element 112 is arranged radially within the discs 114 of the first switching element SE1. Advantageously, the line element 112 is arranged axially overlapping or axially adjacent to the discs 114 of the first switching element SE1. Advantageously, the line element 112 is arranged axially between the housing wall 94 and the second planetary gear set 20. The line element 112 can, as shown in FIG. 2, be arranged axially adjacent to the first planetary gear set 18. However, the line element 112 could also be arranged at least partially axially overlapping with the first planetary gear set 18.

Overall, it can be seen that in the drive device 10, oiling of the first planetary carrier 24 or the first planetary gear bolt 31 of the first planetary carrier 24 takes place from the equalizing housing 62 and here, in particular, from the first oil channel 84. This is particularly advantageously possible when the respective first planetary gear bolt 31 is arranged radially and preferably also axially near the equalizing housing 62. The radial bearing 92 provides a particularly advantageous bearing of the first planetary carrier 24 on the housing 12 in the radial direction of the drive device 10, which is particularly advantageously possible when oiling takes place from the equalizing housing 62, since otherwise the first planetary carrier 24, also referred to as the web, would have to be oiled from the air via a catch plate so to say.

It can be seen particularly well from FIG. 2 that the equalizing housing 62 has an oil outlet opening 118, which is fluidically connected to the first oil channel 84. In particular, the first oil channel 84 opens via the oil outlet opening 118 into a region different to the second oil channel 85, which in this case is a partial region of the receiving chamber 14. Thus, the oil from the first oil channel 82 and in particular from the equalizing housing 62 as a whole can be discharged via the oil outlet opening 118 and guided into said region, i.e. into the partial region of the receiving chamber 14, such that, for example, the oil can be sprayed out of the first oil channel 82 via the oil outlet opening 118 and can be sprayed from the equalizing housing 62, for example.

In particular, for example, the oil originating from the first oil channel 82 can be introduced or fed or injected into the oil channel 100 via the oil outlet opening 118, such that the oil can subsequently flow through the oil channel 100 and thus flow in particular to the respective second bearing.

It can be seen that the oil outlet opening 118 is arranged on a side of the second planetary gear set 20 facing away from the first planetary gear set 18 in the axial direction of the drive device 10.

In the second embodiment, the drive device 10 has a third axial bearing 116, via which the second sun gear 30 and/or the first ring gear 26 are axially and rotatably supported on the planetary carrier 24 and thus mounted. This is possible, in particular, in that the first planetary carrier 24 and the second ring gear 34 are connected, in particular permanently, in a rotationally fixed manner to the equalizing housing 62 and thus offer a left and right axial stop when viewed in the axial direction of the drive device 10 and relative to the image plane in FIG. 2.

FIG. 3 shows a third embodiment of the drive device 10. While in the second embodiment the third axial bearing 116 is arranged axially between the planetary carrier 24 and the second planetary gear set 20, in the third embodiment the axial bearing 116 is arranged in the axial direction between the housing wall 94 and the planetary carrier 24. Via the axial bearing 116, the second sun gear 30 and the first ring gear 26 are axially and rotatably supported on the housing wall 94 and thus mounted.

In the second embodiment, the discs 114 acting as friction elements are arranged radially overlapping with the first planetary gears 28, whereby a free or vacated space above the first planetary gear set 18 can be used. Said space has been freed up in particular by the fact that the largest outer radius of the first planetary gear set 18 lies radially within the largest outer radius of the second planetary gear set 20. In principle, it is conceivable that, for example, the equalizing housing 62 is formed from a first metallic material, in particular from steel, wherein, for example, the planetary carrier 24, in particular the web cheek 86, is formed from a second metallic material different to the first metallic material, in particular aluminum. The planetary carrier 24, in particular the web cheek 86, and the equalizing housing 62 can be formed separately from each other and connected to each other, in particular screwed together. Alternatively, it is preferably provided when the planetary carrier 24, in particular the web cheek 86, and the equalizing housing 62 are formed integrally with each other.

LIST OF REFERENCE NUMBERS

10 Electric drive device
12 Housing
14 Receiving chamber
16 Planetary transmission
18 First planetary gear set
20 Second planetary gear set

22 First sun gear
24 First planetary carrier
26 First ring gear
28 First planetary gear
29 First bearing
30 Second sun gear
31 First planetary gear bolt
32 Second planetary carrier
34 Second ring gear
36 Second planetary gear
37 Second planetary gear bolt
38 Main axis of rotation
40 Electric engine
41 Vehicle wheel
42 Stator
43 Vehicle wheel
44 Rotor
45 Vehicle axle
46 Engine axis of rotation
48 Arrow
50 Input shaft
52 Output shaft
54 Differential transmission
60 Bevel gear differential
62 Equalizing housing
63 Inner peripheral lateral surface
64 Receiving chamber
66 Equalizing gear
68 Equalizing gear
69 Equalizing gear axis of rotation
70 Output gear
72 Output gear
74 Side shaft
76 Side shaft
78 Arrow
80 Arrow
82 Housing wall
84 First oil channel
85 Second oil channel
86 Web cheek
88 Inner chamber
90 Fourth oil channel
92 Radial bearing
94 Housing wall
96 Axial bearing
98 Axial bearing
100 Third oil channel
102 Outlet opening
104 Axial bearing
106 Axial bearing
108 Housing wall
110 Further oil channel
112 Line element
114 Discs
116 Axial bearing
118 Oil outlet opening
SE1 First switching element
SE2 Second switching element

The invention claimed is:

1. An electric drive device for a motor vehicle, the electric drive device comprising:

a housing;

a first planetary gear set arranged in the housing, wherein first planetary gear set has a first sun gear, a first planetary carrier, and a first ring gear as first elements;

an electric engine having a stator and a rotor;

an input shaft drivable by the rotor and permanently connected to the first sun gear in a rotationally fixed manner;

an output shaft;

a differential transmission, wherein the differential transmission has a bevel gear differential with an equalizing housing, which is permanently connected in a rotationally fixed manner to the first planetary carrier, the first planetary gear set and the differential transmission are arranged coaxially to one another, the first sun gear is arranged axially adjacent to the equalizing housing, a largest outer radius of the equalizing housing lies radially outside first planet gear bolts of the first planetary carrier;

a side shaft arranged between the differential transmission and a vehicle wheel of the motor vehicle and passing through the rotor;

a first oil channel arranged within a housing wall of the equalizing housing, wherein the first oil channel is configured so that oil can flow through the first oil channel;

a second oil channel directly fluidically connected to the first oil channel, wherein the second oil channel is arranged within a web cheek of the first planetary carrier; and a second planetary gear set arranged in the housing coaxially to the rotor, wherein the second planetary gear set has, as second elements, a second sun gear which is coupled or is couplable in a rotationally fixed manner to the first ring gear, a second planetary carrier, and a second ring gear, wherein the second ring gear is coupled or is couplable in a rotationally fixed manner to the first planetary carrier, wherein the equalizing housing has an oil outlet opening fluidically connected to the first oil channel and arranged axially on a side of the second planetary gear set facing away from the first planetary gear set.

2. The electric drive device of claim 1, wherein the web cheek is integral to the equalizing housing.

3. The electric drive device of claim 2, wherein the web cheek and the equalizing housing together are an integral cast component.

4. The electric drive device of claim 1, wherein inner chambers of the first planetary gear bolts of the first planetary carrier are directly fluidically connected to the second oil channel.

5. The electric drive device of claim 1, wherein the second sun gear is arranged axially overlapping with the equalizing housing, and wherein an inner diameter of the second sun gear is larger than a largest outer diameter of the equalizing housing.

6. The electric drive device of claim 1, further comprising:

a first axial bearing arranged to axially rotatably support the second sun gear on the second planetary carrier; and a second axial bearing arranged axially adjacent to the first axial bearing, via which the second planetary carrier is axially rotatably supported against the second ring gear or a differential housing.

7. The electric drive device of claim 6, further comprising:

a third oil channel configured so that the oil can flow through the third oil channel, wherein the third oil channel extends axially between at least one first part of the first axial bearing and at least one second part of the second axial bearing; and a further bearing arranged to rotatably mount at least one planetary gear on the second planetary carrier, wherein the further bearing is arranged so that the further bearing is suppliable with oil via the third oil channel.

8. The electric drive device of claim 1, further comprising:

a further oil channel within a housing wall; and a line element connected to the further oil channel and protruding from the housing wall in an axial direction, wherein the line element is arranged axially between the housing wall and the second planetary gear set, wherein the line element is arranged radially within discs of a first switching element.

9. The electric drive device of claim 1, wherein a largest outer radius of the first planetary gear set lies radially within a largest outer radius of the second planetary gear set.

10. A motor vehicle comprising:

at least one wheel; and an electric drive device, which comprises a housing;

a first planetary gear set arranged in the housing, wherein first planetary gear set has a first sun gear, a first planetary carrier, and a first ring gear as first elements;

an electric engine having a stator and a rotor;

an input shaft drivable by the rotor and permanently connected to the first sun gear in a rotationally fixed manner;

an output shaft;

a differential transmission, wherein the differential transmission has a bevel gear differential with an equalizing housing, which is permanently connected in a rotationally fixed manner to the first planetary carrier, the first planetary gear set and the differential transmission are arranged coaxially to one another, the first sun gear is arranged axially adjacent to the equalizing housing, a largest outer radius of the equalizing housing lies radially outside first planet gear bolts of the first planetary carrier;

a side shaft arranged between the differential transmission and the wheel and passing through the rotor;

a first oil channel arranged within a housing wall of the equalizing housing, wherein the first oil channel is configured so that oil can flow through the first oil channel;

a second oil channel directly fluidically connected to the first oil channel, wherein the second oil channel is arranged within a web cheek of the first planetary carrier; and a second planetary gear set arranged in the housing coaxially to the rotor, wherein the second planetary gear set has, as second elements, a second sun gear which is coupled or is couplable in a rotationally fixed manner to the first ring gear, a second planetary carrier, and a second ring gear, wherein the second ring gear is coupled or is couplable in a rotationally fixed manner to the first planetary carrier, wherein the equalizing housing has an oil outlet opening fluidically connected to the first oil channel and arranged axially on a side of the second planetary gear set facing away from the first planetary gear set.

* * * * *